United States Patent
Ahmad et al.

(10) Patent No.: US 9,916,129 B1
(45) Date of Patent: Mar. 13, 2018

(54) FLOW CONTROL FOR DIRECT MEMORY ACCESS TRANSFERS

(71) Applicant: Xilinx, Inc., San Jose, CA (US)

(72) Inventors: Sagheer Ahmad, Cupertino, CA (US); Nishit Patel, San Jose, CA (US); James J. Murray, Los Gatos, CA (US)

(73) Assignee: XILINX, INC., San Jose, CA (US)

(*) Notice: Subject to any disclaimer, the term of this patent is extended or adjusted under 35 U.S.C. 154(b) by 656 days.

(21) Appl. No.: 14/527,677

(22) Filed: Oct. 29, 2014

(51) Int. Cl.
   *G06F 5/14* (2006.01)
   *G06F 13/28* (2006.01)

(52) U.S. Cl.
   CPC .............. *G06F 5/14* (2013.01); *G06F 13/28* (2013.01); *G06F 2205/126* (2013.01)

(58) Field of Classification Search
   CPC ....... G06F 5/14; G06F 13/28; G06F 2205/126
   See application file for complete search history.

(56) References Cited

U.S. PATENT DOCUMENTS

| | | | |
|---|---|---|---|
| 5,918,055 A * | 6/1999 | Crawford | G06F 9/50 710/1 |
| 6,333,938 B1 * | 12/2001 | Baker | G06F 9/4411 370/503 |
| 2004/0165609 A1 * | 8/2004 | Herbst | H04L 12/56 370/412 |
| 2012/0089812 A1 * | 4/2012 | Smith | G06F 9/4843 712/21 |

OTHER PUBLICATIONS

Altera Corporation, "Arria 10 Hard Processor System Technical Reference Manual", a10_5v4, Aug. 18, 2014, pp. 9-27-9-28, San Jose, CA USA.

* cited by examiner

*Primary Examiner* — Henry Tsai
*Assistant Examiner* — John Roche
(74) *Attorney, Agent, or Firm* — LeRoy D. Maunu (57) ABSTRACT

Circuits and methods are disclosed that allow devices to control the flow of DMA transfers to or from the devices using a token based protocol. In one example implementation, a DMA circuit includes a transfer control circuit that performs data transfers over a first data channel of a device, when transactions on the first data channel are enabled. The DMA circuit includes a flow control circuit that increments a token count for a data channel of a device when a token for the data channel is received and decrements the token count for each data transfer on the data channel performed by the DMA circuit. The flow control circuit enables data transfers on the data channel when the token count is greater than 0, and otherwise, disables data transfers on the data channel.

20 Claims, 4 Drawing Sheets

FLOW CONTROL FOR DIRECT MEMORY ACCESS TRANSFERS

FIELD OF THE INVENTION

The disclosure generally relates to communication circuits and more particularly to direct memory access communication circuits.

BACKGROUND

Direct memory access (DMA) is a method of transferring data from one location to another location without the intervention of a device that initiates the data transfer. DMA transfers of data are performed by a DMA controller, which includes specialized hardware for conducting the DMA transfers quickly and efficiently. This allows for large data transfers to be conducted without imposing a significant burden on the device that initiated the data transfer. DMA data transfers are used for data transfers between various devices, e.g., input/output devices, and also for memory-to-memory data transfers.

SUMMARY

A DMA circuit is disclosed that includes data storage, a flow control circuit connected to the data storage, and a transfer control circuit connected to the flow control circuit. The flow control circuit increments a first token count associated with a first data channel of a device in response to receiving a token indicative of the first data channel. The flow control circuit decrements the first token count for each data transfer on the first data channel performed by the DMA circuit. The flow control circuit enables data transfers on the first data channel in response to the first token count being greater than or equal to 1. The flow control circuit disables data transfers on the first data channel in response to the first token count being equal to 0.

The transfer control circuit performs a data transfer, specified by a DMA transfer request, on a first data channel in response to receiving the DMA transfer request and DMA transfers on the first data channel being enabled. In response to receiving a DMA transfer request that specifies a data transfer on the first data channel of the device and DMA transfers on the first data channel being disabled, the transfer control circuit stores the DMA transfer request in a first buffer.

A system is also disclosed that includes a DMA circuit having a data storage, a flow control circuit, and a transfer control circuit. For each of a plurality of data channels, the flow control circuit increments a respective token count associated with the data channel in response to receiving a token indicative of the data channel. The flow control circuit decrements the respective token count for each data transfer on the first data channel performed by the DMA circuit. The flow control circuit enables data transfers on the data channel in response to the respective token count being greater than or equal to 1. The flow control circuit disables data transfers on the data channel in response to the first token count being equal to 0.

For each of the data channels, the transfer control circuit performs a data transfer, specified by a DMA transfer request, on the data channel in response to receiving the DMA transfer request and DMA transfers on the data channel being enabled. In response to receiving a DMA transfer request that specifies a data transfer on the first data channel of the device and DMA transfers on the data channel being disabled, the transfer control circuit stores the DMA transfer request in a respective buffer for the data channel.

A method for regulating DMA transfers is also disclosed. In response to a DMA circuit receiving a token indicative of a first data channel of a device, a first token count associated with the first data channel is incremented by the DMA circuit. In response to the DMA circuit receiving a DMA transfer request that specifies a data transfer on the first data channel of the device and the first token count being greater than or equal to 1, the DMA circuit decrements the first token count and performs the data transfer specified by the DMA transfer request. In response to receiving a DMA transfer request that specifies a data transfer on the first data channel of the device and the first token count being equal to 0, the DMA circuit stores the DMA transfer request in a first buffer.

Other features will be recognized from consideration of the Detailed Description and Claims, which follow.

BRIEF DESCRIPTION OF THE DRAWINGS

Various aspects and features of the methods, circuits, and systems will become apparent upon review of the following detailed description and upon reference to the drawings in which.

DETAILED DESCRIPTION OF THE DRAWINGS

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

When a DMA transfer is initiated, a DMA transfer controller issues read transactions to retrieve a set of data from source addresses specified in a source descriptor and issues write transactions to write the retrieved set of data to destination addresses specified in a destination descriptor. For data transfers to or from a buffer of a device, unregulated flow of the DMA transfers may cause the buffer to underflow or overflow. For example, an I/O device of a system may receive data from an external source at a first data rate and place the data in a source buffer so it may be accessed by various devices of the system. DMA transfer transactions may attempt to read data from the source buffer at a rate that is faster than the rate at which the data is placed in the source buffer. If the DMA transfer controller is allowed to issue read requests without any feedback from the I/O device, the I/O device may underflow the source buffer and respond with invalid data, or an interconnect of the device that receives requests for data transfers may become blocked by too many outstanding read requests. Conversely, if the DMA transfer controller is allowed to initiate new write transfers to a destination buffer of a device without feedback from the I/O device, the DMA transfer controller may write data at a faster rate than the data can be removed from the buffer and processed by the I/O device—resulting in an overflow of the destination buffer.

Circuits and methods are disclosed that allow devices to control the flow of DMA transfers to or from the devices. In various implementations, the number of DMA transfers that may be issued for a data channel to or from a device are controlled by the device using a token based protocol.

In some implementations, a system includes a DMA circuit having a transfer control circuit (e.g., a DMA engine) that performs DMA transfers to and/or from buffers of various devices in a system. The DMA circuit includes a flow control circuit configured to enable or disable data transfers by the transfer control circuit based on a data channel to or from a device based on the receipt of tokens from the device. For ease of reference, the data channel for which transfers are enabled and disabled by the flow control circuit may be referred to as flow-regulated data channels. The flow control circuit maintains a respective token count for each flow-regulated data channel. The flow control circuit increments the respective token count associated with a data channel in response to receiving a token for the data channel from a corresponding device. The flow control circuit decrements the token count of a data channel for each DMA transfer performed by the DMA circuit via the data channel. The flow control circuit enables new data transfers to be initiated on the first data channel when the token count is greater than or equal to one and disables initiation of new data transfers on the first data channel when the token count decreases to zero.

The DMA circuit also includes a transfer control circuit (e.g., a DMA engine) configured to perform requested data transfers via a flow-regulated data channel, when the flow control circuit enables data transfers for the flow-regulated data channel. When new data transfers for the flow-regulated channel are disabled by the flow control circuit, the transfer control circuit stores DMA requests corresponding to a flow-regulated channel in a DMA request buffer. When another token is received for the flow-regulated channel, a buffered DMA request is removed from the DMA request buffer and the data transfer specified by the request is performed.

In some implementations, a device in the system includes a flow control interface, which is a circuit that regulates the flow of DMA transfers on a data channel to and/or from buffers of the device by issuing tokens indicative of the data channel to the flow control circuit of the DMA circuit according to a respective flow control algorithm for the data channel. The number of outstanding tokens issued by the flow control interface regulates the maximum number of new transfers that may be initiated for the data channel before additional tokens are issued.

The flow control algorithm used by the flow control interface may utilize various criteria to determine when to issue new tokens for the data channel. In some implementations, the flow control algorithm may issue new tokens for a data channel in response to the device having bandwidth sufficient to perform additional data transfers via the first data channel. In some implementations, the flow control algorithm may issue new tokens for a data channel as data transfers on the data channel are completed. In some other implementations, the flow control algorithm may issue new tokens to maintain a ratio of read and write transfers for the device. For instance, the flow control interface may count transfers on a read data channel with a counter. In response to the counted number of read transfers exceeding a threshold number, the flow control interface may issue a new token for a write data channel and reset the counter.

Figure 1:
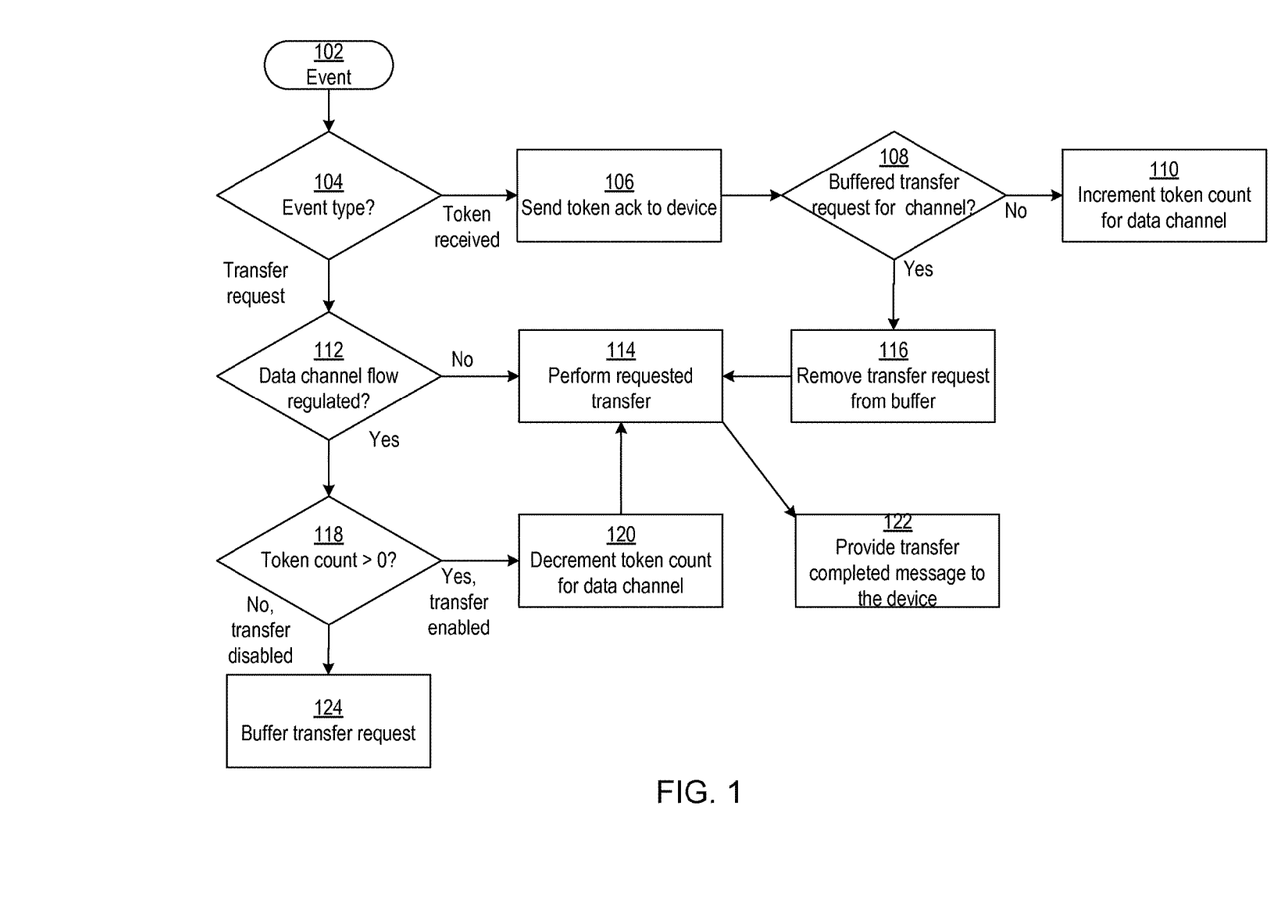
FIG. 1 shows a process for operating a DMA control circuit, consistent with one or more implementations.

Turning now to the figures, FIG. 1 shows a process for operating a DMA control circuit, consistent with one or more implementations. The process begins at decision block 104 when an event 102 occurs. If the event is the receipt of a token for a data channel from a device, decision block 104 directs the process to send a token acknowledgement to the device at block 106. If no acknowledgement is provided to the device, it may indicate that DMA control circuit is not yet ready to transfer data on the data channel.

If there are no buffered transfer requests for the data channel corresponding to the received token, decision block 108 directs the process to increment the token count for the data channel at block 110. Otherwise, if there are buffered transfer requests for the corresponding data channel, decision block 108 directs the process to remove the transfer request from the buffer at block 116 and perform the requested transfer at block 114.

If the event 102 is the receipt of a transfer request, decision block 104 directs the process to decision block 112. If the data channel needed to perform the requested transfer is not a flow-regulated data channel, decision block 112 directs the process to perform the requested data transfer at block 114. Otherwise, if the data channel corresponding to the required data channel for the requested transfer is a flow-regulated data channel, decision block 112 directs the process to decision block 118. If the token count for the flow-regulated data channel is not greater than zero, new transfers are currently disabled and the process buffers the data transfer request at block 124. Otherwise, if the token count is greater than zero, the token count for the flow-regulated data channel is decremented by one at block 120 and the requested transfer is performed at block 114.

After performing the requested data transfer at block 114, the process provides a transfer completed message to the device at block 122. In some implementations, receipt of the transfer completed message may prompt the device to issue another token for the data channel.

Figure 2:
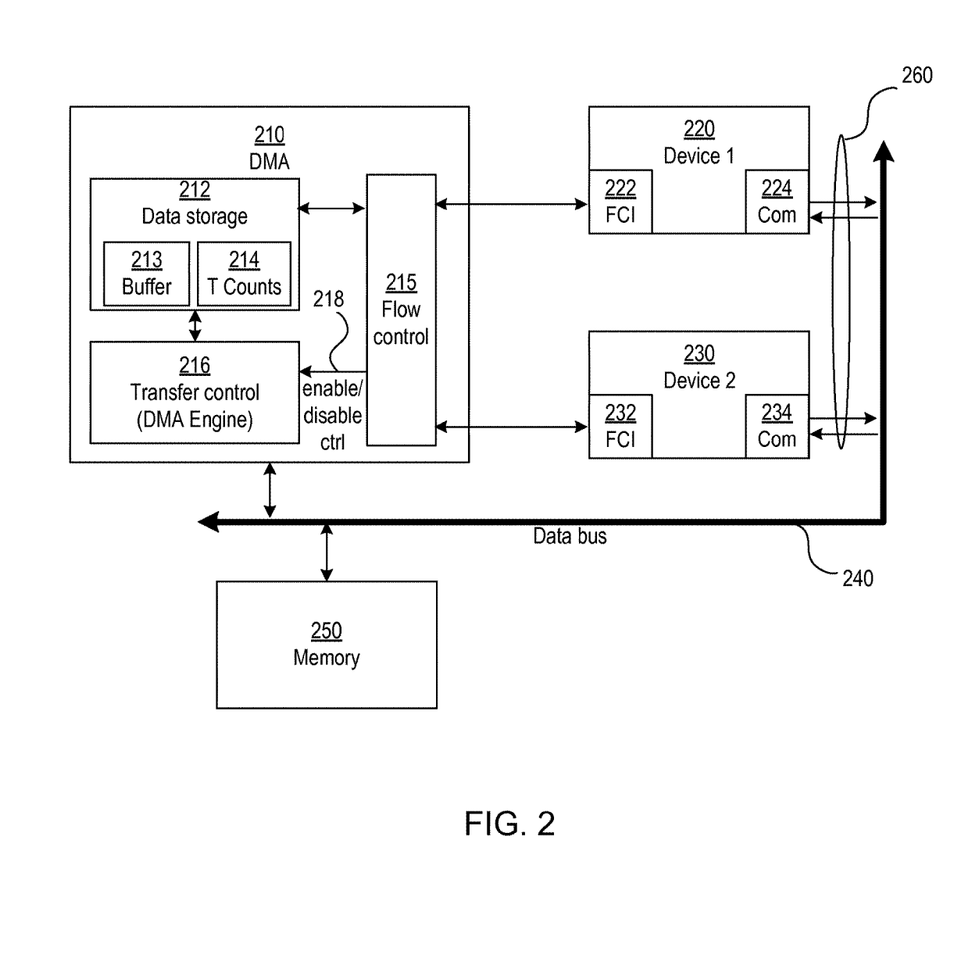
FIG. 2 shows a system configured to perform DMA transfers with flow control, consistent with one or more implementations.

FIG. 2 shows a system configured to perform DMA transfers with flow control, consistent with one or more implementations. The system includes a DMA circuit 210 configured to perform DMA transfers between various portions of a system over a data bus 240. In this example, DMA circuit 210 is configured to transfer data to and/or from a first device 220, a second device 230, and/or a memory 250. The first and second devices 220 and 230 communicate data to and/or from the data bus via one of more data channels 260.

The DMA circuit includes a transfer control circuit 216 (e.g., a DMA engine) that performs data transfers indicated by DMA transfer requests. The DMA transfer requests may specify data transfers to be performed, for example, via data channels to or from the device 220, device 230, and/or the memory 250. DMA transfer requests may be provided, for example, from one of the devices 220 and 230 or another processing circuit (not shown), to the DMA circuit 210 via the data bus 240.

The DMA circuit also includes a flow control circuit 215 that controls data transfers over at least one of the data channels 260 to or from a device according to tokens issued by the device. For each flow-regulated data channel, the flow control circuit 215 maintains a respective one of a set of token counts 214 in data storage 212, which may include memory local to the flow control circuit 215 and transfer control circuit 216. The token count for a data channel indicates a number of tokens for the data channel that have been received and which have not been used. The flow control circuit 215 increments the respective token count for a data channel in response to receiving a token indicative of the data channel. The flow control circuit 215 decrements the respective token count for a data channel in response to the transfer control circuit initiating a new data transfer on the data channel.

When the corresponding token count for a data channel is equal to zero, the flow control circuit 215 disables initiation of new data transfers on a data channel. When the corresponding token count for a data channel is greater than zero, the flow control circuit 215 enables initiation of new data transfers on a data channel. In some implementations, the flow control circuit 215 provides control signals 218 to the transfer control circuit 216 to enable or disable initiation of new transfers on each data channel. In some other implementations, the flow control circuit 215 may adjust values of control registers to enable or disable initiation of new transfers on the data channels. Before initiating a new transfer on a data channel, the transfer control circuit 216 may check the value of a corresponding control register to determine whether or not initiation of new transfers on the data channels is enabled.

When a DMA transfer request for a flow-regulated data channel is received, the transfer control circuit 216 performs a data transfer indicated by the DMA transfer request if initiation of new transfers is enabled for the flow-regulated data channel (i.e., when token count>0). Otherwise, if initiation of new transfers is disabled for the flow-regulated data channel corresponding to the received transfer request channel (i.e., when token count=0), the transfer request is buffered, for example, in a buffer 213 implemented in data storage 212. When initiation of new transfers on the data channel is re-enabled, in response to receiving a token for the data channel, the transfer control circuit 216 removes the transfer request from the buffer and performs the data transfer specified by the transfer request.

For each flow-regulated data channel of a device, the device includes a communication circuit, for example 224 and 234 in the first and second devices 220 and 230, configured to communicate data over the communication channel in response to the DMA circuit 210. The device also includes for each flow-regulated data channel of a device, a flow control interface, for example 222 and 232 in the first and second devices 220 and 230. Each flow control interface is configured to regulate the flow of DMA transfers on a data channel by issuing tokens indicative of the data channel to the flow control circuit 215 of the DMA circuit 210 according to a respective flow control algorithm. The number of outstanding tokens issued by the flow control interface, regulates the maximum number of new transfers that may be initiated on the data channel, by the transfer control circuit 216, before additional tokens are received. In various implementations, the flow control interfaces 222 and 232 may issue tokens according to the same flow control algorithm or according to different flow control algorithms. As previously discussed, the flow control algorithms implemented by flow control interfaces 222 and 232 may issue new tokens based on various criteria including for example, completion of data transfers, a number of outstanding tokens, and/or a ratio of read transaction to write transactions.

Figure 3:
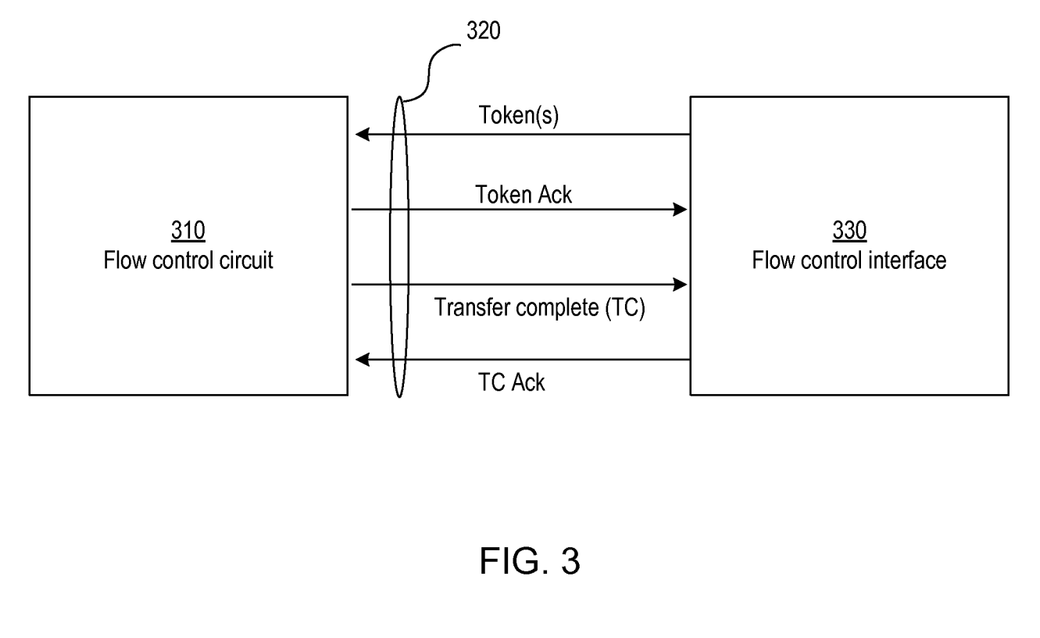
FIG. 3 shows a flow control circuit and flow control interface, consistent with one or more implementations.

FIG. 3 shows a flow control circuit and flow control interface, consistent with one or more implementations. In this example, the flow control circuit 310 and the flow control interface 330 exchange control signals using a set of signal lines 320. The flow control interface 330 authorizes a DMA circuit to perform a number (N) of data transfers on a flow-controlled data channel by transmitting N tokens to the flow control circuit 310 via a respective one of the signal lines 320.

As described with reference to FIGS. 1 and 2, in response to receiving a token for a data channel, the flow control circuit 310 increments a respective token count for the data channel and communicates an acknowledgement of the token to the flow control interface 330. The flow control interface 330 may be configured to retransmit a token to the flow control circuit 310 if an acknowledgement is not received within a threshold period of time. When data transfers are completed, the flow control circuit 310 provides a transfer complete message to the flow control interface. In some implementations, the flow control interface may be configured to provide additional tokens to the flow control circuit 310 as previous transfers are completed. The flow control interface provides an acknowledgement of the transfer complete message to the flow control circuit 310. The flow control circuit may be configured to retransmit a transfer complete message if an acknowledgement is not received within a threshold period of time.

The token, token acknowledgement, transfer complete, and transfer complete acknowledgement control signals may be communicated using various communication protocols. In some implementations, the control signals may be communicated, for example, as pulses on respective signal lines. For example, tokens may be communicated as respective pulses on a first one of the signal lines 320. In some other implementations, a data symbol may be used to represent multiple tokens, token acknowledgements, transfer complete messages or transfer complete acknowledgements.

The disclosed methods and circuits may be used in a variety of applications and systems that utilize DMA to perform data transfers. The methods and circuits are thought to be particularly useful for use in programmable integrated circuits (ICs). One type of PLD, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include an embedded processor that is capable of executing a program code portion of a user design. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

Figure 4:
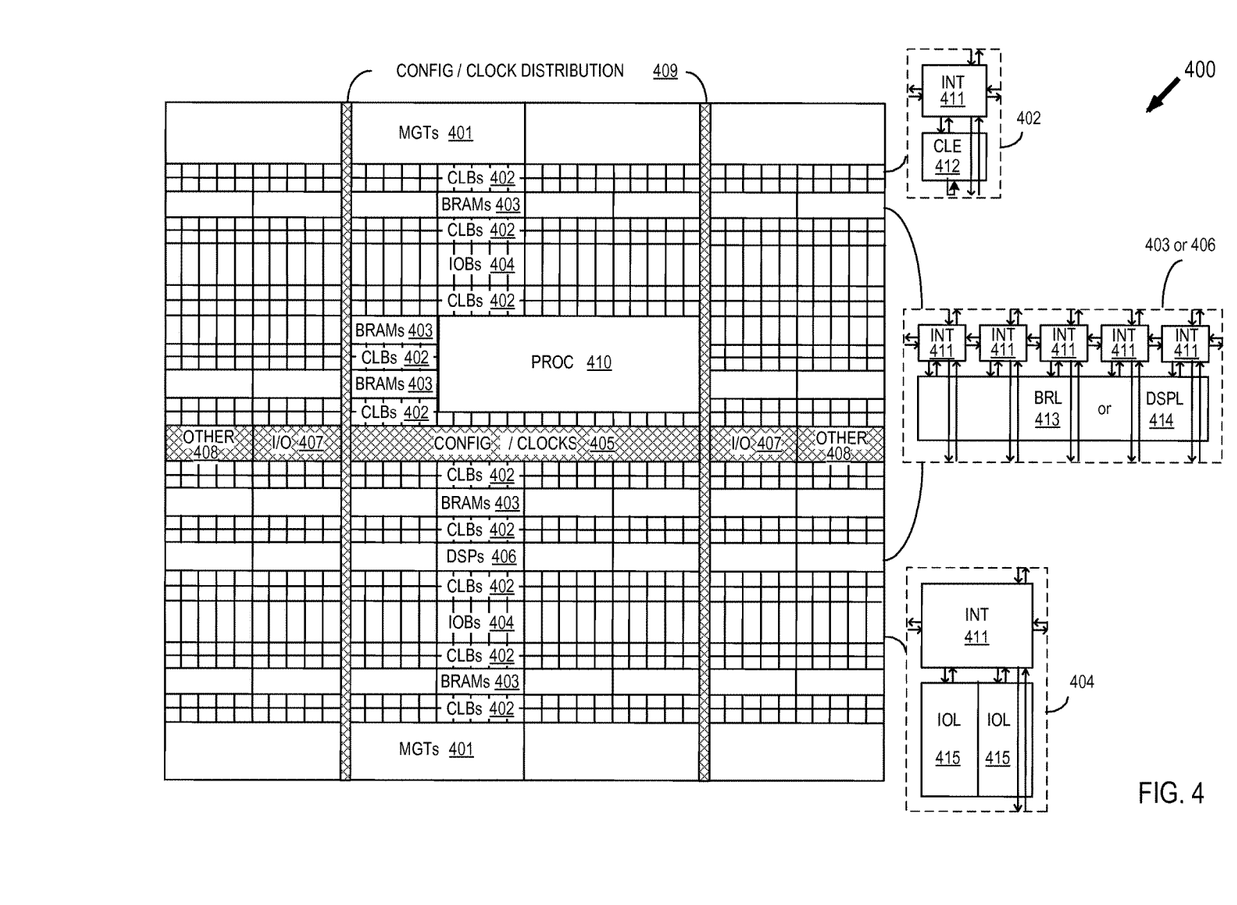
FIG. 4 shows a programmable integrated circuit (IC), which may be configured to perform DMA data transfers in accordance with one or more implementations.

FIG. 4 shows a programmable integrated circuit (IC) 400, which may be configured to perform DMA data transfers in accordance with one or more implementations. The programmable IC may also be referred to as a System On Chip (SOC) that includes field programmable gate array logic (FPGA) along with other programmable resources. FPGA logic may include several different types of programmable logic blocks in the array. For example, FIG. 4 illustrates a programmable IC 400 that includes a large number of different programmable tiles including multi-gigabit transceivers (MGTs) 401, configurable logic blocks (CLBs) 402, random access memory blocks (BRAMs) 403, input/output blocks (IOBs) 404, configuration and clocking logic (CONFIG/CLOCKS) 405, digital signal processing blocks (DSPs) 406, specialized input/output blocks (I/O) 407, for example, clock ports, and other programmable logic 408 such as digital clock managers, analog-to-digital converters, system monitoring logic, and so forth. Some programmable ICs also include dedicated processor blocks (PROC) 410 and internal and external reconfiguration ports (not shown).

In some FPGA logic, each programmable tile includes a programmable interconnect element (INT) 411 having standardized connections to and from a corresponding interconnect element in each adjacent tile. Therefore, the programmable interconnect elements taken together implement the programmable interconnect structure for the illustrated FPGA logic. The programmable interconnect element INT 411 also includes the connections to and from the programmable logic element within the same tile, as shown by the examples included at the top of FIG. 4.

For example, a CLB 402 can include a configurable logic element CLE 412 that can be programmed to implement user logic, plus a single programmable interconnect element INT 411. A BRAM 403 can include a BRAM logic element (BRL) 413 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 406 can include a DSP logic element (DSPL) 414 in addition to an appropriate number of programmable interconnect elements. An 10B 404 can include, for example, two instances of an input/output logic element (IOL) 415 in addition to one instance of the programmable interconnect element INT 411. As will be clear to those of skill in the art, the actual I/O bond pads connected, for example, to the I/O logic element 415, are manufactured using metal layered above the various illustrated logic blocks, and typically are not confined to the area of the input/output logic element 415.

In the pictured embodiment, a columnar area near the center of the die (shown shaded in FIG. 4) is used for configuration, clock, and other control logic. Horizontal areas 409 extending from this column are used to distribute the clocks and configuration signals across the breadth of the programmable IC.

Some programmable ICs utilizing the architecture illustrated in FIG. 4 include additional logic blocks that disrupt the regular columnar structure making up a large part of the programmable IC. The additional logic blocks can be programmable blocks and/or dedicated logic. For example, the processor block PROC 410 shown in FIG. 4 spans several columns of CLBs and BRAMs.

Note that FIG. 4 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 4 are purely exemplary. For example, in an actual programmable IC, more than one adjacent column of CLBs is typically included wherever the CLBs appear, to facilitate the efficient implementation of user logic.

The methods and circuits are thought to be applicable to a variety of systems and applications. Other aspects and features will be apparent to those skilled in the art from consideration of the specification. For example, although aspects and features may in some cases be described in individual figures, it will be appreciated that features from one figure can be combined with features of another figure even though the combination is not explicitly shown or explicitly described as a combination. The methods and circuits may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A direct memory access (DMA) circuit comprising:
   data storage;
   a flow control circuit connected to the data storage and configured to:
      in response to receiving one or more tokens indicative of a first data channel of a device, increment a first token count associated with the first data channel for each of the one or more tokens;
      decrement the first token count for each data transfer on the first data channel performed by the DMA circuit;
      enable data transfers on the first data channel in response to the first token count being greater than or equal to 1; and
      disable data transfers on the first data channel in response to the first token count being equal to 0; and
   a transfer control circuit connected to the flow control circuit and configured to:
      in response to receiving a DMA transfer request that specifies a data transfer on the first data channel and DMA transfers on the first data channel being enabled, perform the data transfer specified by the DMA transfer request; and
      in response to receiving a DMA transfer request that specifies a data transfer on the first data channel of the device and DMA transfers on the first data channel being disabled, store the DMA transfer request in a first buffer.

2. The DMA circuit of claim 1, wherein the transfer control circuit is configured to perform the data transfer specified by the DMA transfer request stored in the first buffer in response to the flow control circuit receiving a token indicative of the first data channel.

3. The DMA circuit of claim 1, wherein:
   the flow control circuit of the DMA circuit is further configured to, for each received token indicative of the first data channel, provide a token acknowledgement message to the device.

4. The DMA circuit of claim 1, wherein the flow control circuit of the DMA circuit is further configured to provide a transfer complete message to the device in response to the transfer control circuit completing the data transfer specified by the DMA transfer request.

5. The DMA circuit of claim 4, wherein the device includes a flow control interface configured to provide an additional token indicative of the first data channel to the flow control circuit of the DMA circuit, in response to receiving the transfer complete message.

6. The DMA circuit of claim 1, wherein the flow control circuit is further configured to:
in response to receiving a token indicative of a second data channel of the device, increment a second token count associated with the second data channel for each token indicative of the second data channel;
decrement the second token count for each data transfer on the second data channel performed by the DMA circuit;
enable data transfers on the second data channel in response to the second token count being greater than or equal to 1; and
disable data transfers on the second data channel in response to the second token count being equal to 0.

7. A system, comprising:
a direct memory access (DMA) circuit including:
a data storage;
a flow control circuit connected to the data storage and configured to, for each of a plurality of data channels:
in response to receiving one or more tokens indicative of the data channel of a device, increment a respective token count associated with the data channel for each of the one or more tokens;
decrement the respective token count for each data transfer on the data channel performed by the DMA circuit;
enable data transfers on the data channel in response to the respective token count being greater than or equal to 1; and
disable data transfers on the data channel in response to the respective token count being equal to 0; and
a transfer control circuit connected to the flow control circuit and configured to, for each of the plurality of data channels:
in response to receiving a DMA transfer request that specifies a data transfer on the data channel and DMA transfers on the data channel being enabled, perform the data transfer specified by the DMA transfer request; and
in response to receiving a DMA transfer request that specifies a data transfer on the data channel of the device and DMA transfers on the first data channel being disabled, store the DMA transfer request in a respective buffer for the data channel.

8. The system of claim 7, wherein the plurality of data channels includes a first data channel and a second data channel; and further comprising:
first and second devices, each including:
a communication circuit configured to communicate data on a respective one of the plurality of data channels in response to the DMA circuit; and
a flow control interface, configured to provide the one or more tokens indicative of the respective data channel of the device according to a respective flow control algorithm.

9. The system of claim 8, wherein:
the respective flow control algorithm for the flow control interface of the first device is different from the respective flow control algorithm for the flow control interface of the second device;
write transfers to the first device are performed via a first one of the data channels and read transfers from the device are performed using a second one of the data channels; and
the flow control interface of the first device is configured to provide an additional token indicative of the first one of the data channels to the flow control circuit of the DMA circuit, in response to the transfer control circuit completing a predetermined number of data transfers on the second data channel.

10. A method for regulating direct memory access (DMA) transfers, comprising:
incrementing by a DMA circuit, in response to receiving one or more tokens indicative of a first data channel of a device, a first token count associated with the first data channel for each of the one or more tokens;
decrementing by the DMA circuit, in response to receiving a DMA transfer request that specifies a data transfer on the first data channel of the device and the first token count being greater than or equal to 1, the first token count and performing the data transfer specified by the DMA transfer request; and
storing, in response to receiving a DMA transfer request that specifies a data transfer on the first data channel of the device and the first token count being equal to 0, the DMA transfer request in a first buffer.

11. The method of claim 10, further comprising
in response to receiving a token indicative of the first data channel and a DMA transfer request being stored in the first buffer, removing the DMA transfer request from the first buffer, and performing the data transfer specified by the DMA transfer request.

12. The method of claim 10, further comprising:
providing the token for the first data channel of the device to the DMA circuit in response to bandwidth becoming available for the device to perform additional data transfers on the first data channel.

13. The method of claim 10, further comprising at the device:
counting a number of DMA transfers performed on a second data channel of the device with a counter; and
in response to the number of DMA transfers counted by the counter reaching a threshold number, providing the token for the first data channel of the device to the DMA circuit and resetting the counter.

14. The method of claim 10, further comprising:
in response to receiving a token from the device for a second data channel of the device:
incrementing a second token count associated with the second data channel of the device; and
in response to receiving a DMA transfer request that specifies a data transfer on the second data channel of the device and the second token count being greater than or equal to 1, decrementing the second token count and performing the data transfer specified by the DMA transfer request; and
in response to receiving a DMA transfer request that specifies a data transfer on the second data channel of the device and the second token count for the second data channel being equal to 0, storing the DMA transfer request in a second buffer.

15. The method of claim 14, further comprising:
in response to receiving a token indicative of the first data channel and a transfer request being stored in the second buffer, removing the DMA transfer request from the second buffer, and performing the data transfer specified by the DMA transfer request.

16. The method of claim 14, wherein the first data channel is a write channel and the second data channel is a read channel.

17. The method of claim 10, further comprising:
for each received token indicative of the first data channel, providing a token acknowledgement message to the device.

18. The method of claim 17, further comprising: using the device, performing operations including:
providing a token indicative of the first data channel to the DMA circuit; and
providing another token indicative of the first data channel to the DMA circuit, in response to the DMA circuit failing to provide the token acknowledgement message to the device within a threshold period of time.

19. The method of claim 18, wherein:
the providing of the each token indicative of the first data channel to the DMA circuit includes transmitting a pulse on a first signal line; and
the providing the token acknowledgement message to the device includes transmitting a pulse on a second signal line.

20. The method of claim 10, further comprising:
using the DMA circuit, providing a transfer complete message to the device in response to completing the data transfer specified by the DMA transfer request; and
using the device, providing another token indicative of the first data channel to the DMA circuit in response to receiving the transfer complete message.

\* \* \* \* \*